UNITED STATES PATENT OFFICE.

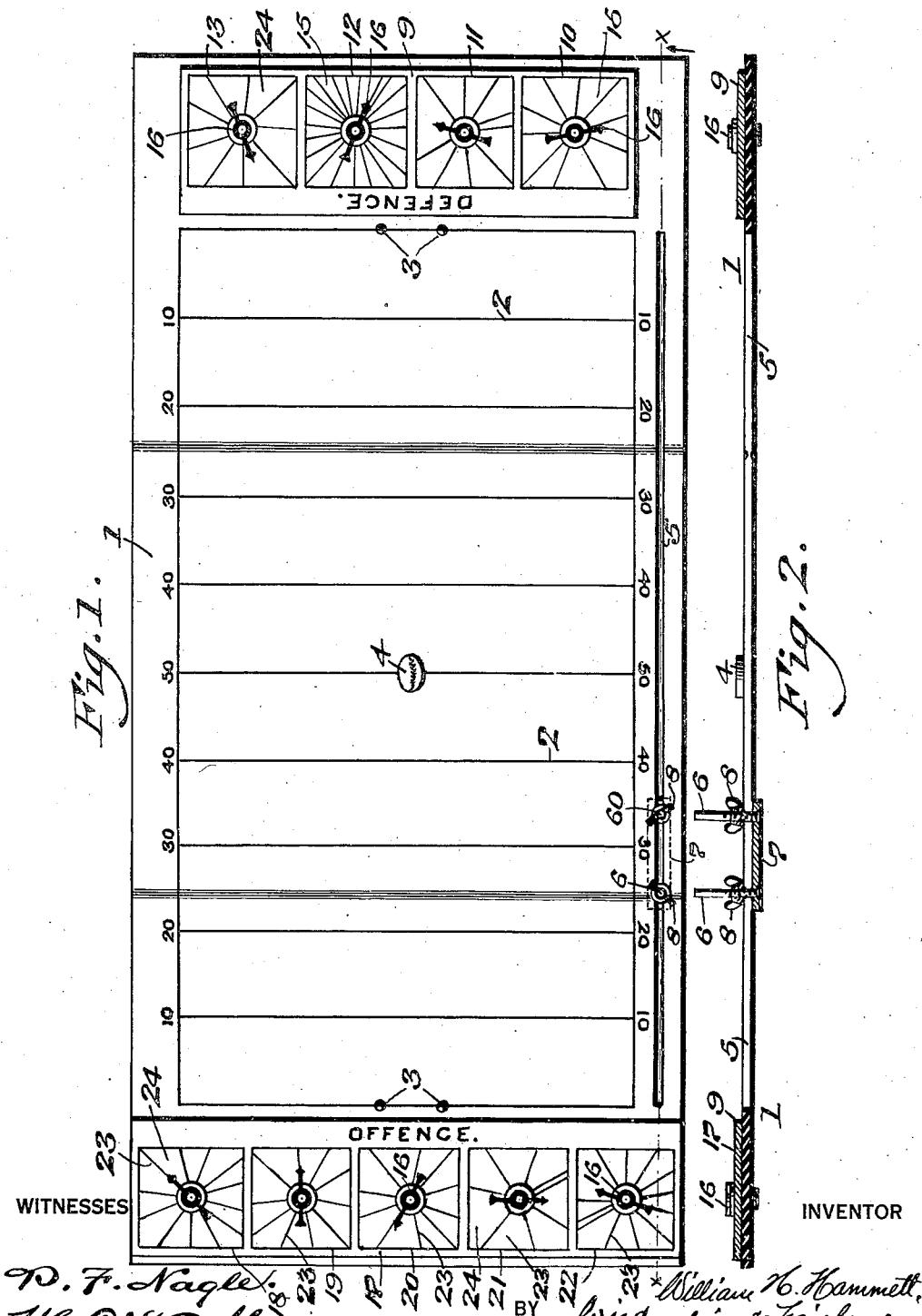

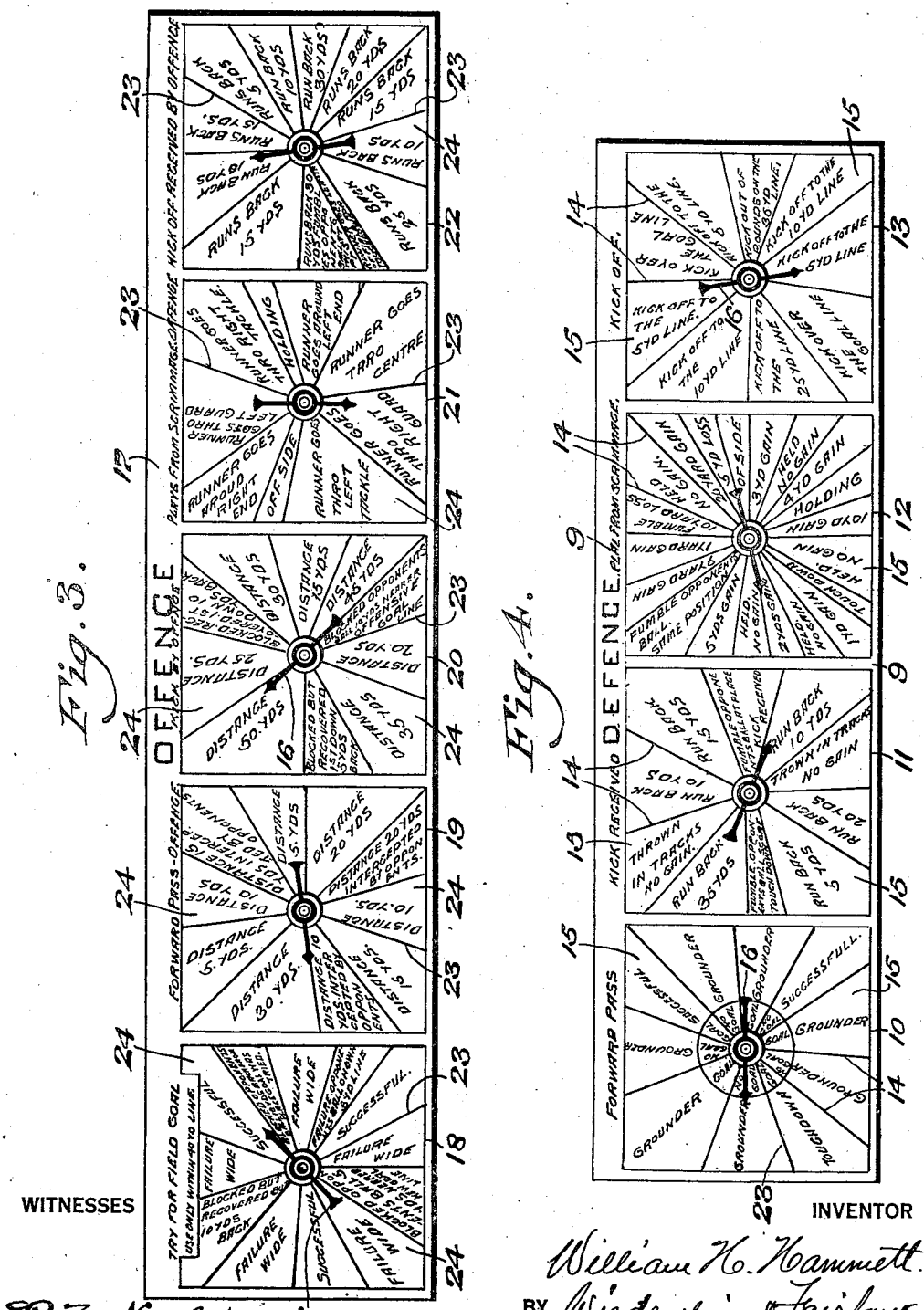

WILLIAM H. HAMMETT, OF STRAFFORD, PENNSYLVANIA.

GAME APPARATUS.

1,149,753.     Specification of Letters Patent.     Patented Aug. 10, 1915.

Application filed March 23, 1915. Serial No. 16,326.

*To all whom it may concern:*

Be it known that I, WILLIAM H. HAMMETT, a citizen of the United States, residing at Strafford, in the county of Chester, State of Pennsylvania, have invented a new and useful Game Apparatus, of which the following is a specification.

My invention relates to a new and novel game apparatus, and consists of a board having graduations thereon representing a football field, and with series of indications of play, one series indicating offensive plays and the other series indicating defensive plays, and each series comprising sets, each set indicating different characters of plays and a pointer for each set, whereby the character of play may be selected by player.

It further consists in providing distance-markers slidable on the board and which are adapted to be moved to indicate the required distance the ball must travel for a first down.

It further consists of novel features of construction, all as will be hereinafter set forth.

For the purpose of illustrating my invention, I have shown in the accompanying drawings one form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 is a plan-view of a game apparatus embodying my invention. Fig. 2 is a sectional view on line *x—x* Fig. 1. Figs. 3 and 4 are plan views, on an enlarged scale, showing the series of indications employed.

Similar numerals of reference indicate corresponding parts in the figures.

Referring to the drawings:—1 designates a board of any suitable form and size, and, as here shown, is arranged in three sections suitably hinged together in order that the board may be folded when not in use.

2 designates a series of graduations on the board representing the so-called gridiron of a foot-ball field, the said graduations being spaced to indicate the ten-yard distance which it is necessary for the ball to travel or to be moved for a first down.

3 designates the representations of the goal-posts and 4 is a movable object or article representing the foot-ball which is moved on the board depending upon the play. Suitable distance markers are employed, which are slidable or movable on the board, to be suitably located to indicate the required distance the ball must travel, and as here shown, I have provided a slot 5 extending the length of the indications of the gridiron, in which slot is movable the pins 6 carried by a plate 7 and which also carries the engaging members 8, here shown as wing-nuts, in order that the distance marker may be removed from the slot when the board is folded and also to permit of the said distance marker being moved backward and forward along the board, as the football 4 is moved thereon. At suitable points, I provide series of indicators of plays, one series representing the plays for the defense and the other series representing the plays for the offense, and in the drawing, I have shown the same located at side ends of the board, although the same can be suitably located at any suitable points, as may be desirable.

9 designates the indications of series for the defense, which are arranged in sets 10, 11, 12 and 13, each set representing a different character of play, and each set being sub-divided by the division lines 14, forming the spaces 15, which may be of different sizes and in each of which suitable notation is provided to indicate a particular play of character of that set. Each set is provided with a rotatably mounted pointer 16, in order that when the pointer is spun by the player, a particular play of that character will be indicated. For example, the characters of play indicated in different sets of the series for defense is "Forward pass," "Kick received," "Play from scrimmage" and "Kick off," while in each set, the sub-divisions indicate the particular play, that is under "Forward pass" appears "Successful," "Grounder," etc.; under "Kick received" appears "Run back 35 yds.," "Thrown in tracks," "No gain," etc.; under "Play from scrimmage" appears "9 yd. gain," "Fumble 10 yd. loss," "1 yd. gain," etc. From this, it will be understood that the player may select what character of play is to be made, and by spinning the pointer, the particular play will be indicated, the ball 4 is moved accordingly, and the distance markers are correspondingly moved.

17 designates the series of indications for the offense, which is formed in sets, as 18, 19, 20, 21, and 22, each set indicating character of plays and each set being sub-divided by the division lines 23 forming the spaces 24 in each of which, suitable notation is provided to indicate a particular play of the character of that set. For example, the character of play indicated in the series for offense is "Try for field-goal," "Forward pass," "Kick," "Plays from scrimmage" and "Kick-off received."

While in each set, the sub-divisions indicate the particular play, that is under "Try from field goal" appears "Failure wide," "Successful" etc.; under "Forward pass" appears "Distance 5 yds.," "Distance 10 yds.," "Distance 15 yds," etc.; under "Kick" appears "Blocked," "Distance 25 yds." etc.; under "Plays from scrimmage" appears "Runner goes through left guard," "Runner goes through center" etc., and under "Kick off received" appears "Runs back 15 yds.," "Runs back 10 yds.," "Runs back 30 yds. fumbles" etc. In each of the sets therefore under the different headings, the sets are divided to indicate what occurs or the particular play of the character of the set, and the player having selected the character of play to be made spins the pointer thereof which will indicate, by stopping at one of these sub-divisions, the particular play thereof and the ball 4 is moved correspondingly upon the board, after which the distance markers 6 are also moved to the proper position.

In playing the game it will be seen that the player for offense decides as to what character of play he desires to make and supposing he selects "Plays from scrimmage" he thereupon spins the pointer of that set which will indicate the character of the play of that set. Thus in the position seen in Fig. 3, the pointer is indicating "Runner goes through right guard." In answer to this the player for defense spins the pointer in his set of "Plays from scrimmage," that is, the answering set, and as seen in Fig. 4, the pointer indicates "Two yards gain" showing that the runner going through the right guard has made a two yard gain and the ball is correspondingly moved on the game board. From this it will be seen that I provide two separate series of indications of play one for offense and the other for defense each being divided into sets and each set being further subdivided into fields with notations thereon, each set of the defense corresponding to a set for offense, by reason of which it is necessary for each player to play in alternation, in order to finally determine the result of a play.

From the above, it will be understood that I have devised a new and novel game apparatus, by means of which the players each may select or decide what character of play they desire to make, and by means of the pointers, the particular play will be indicated.

It will now be apparent that I have devised a novel and useful game apparatus, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

A game apparatus for playing foot ball including a board having a series of graduations representing the divisions of a foot ball field, in combination with a series of indications of plays for offense, subdivided into a plurality of independent sets, each for a particular character of play and each set being further subdivided to form fields of varying widths, each field containing notations to indicate a particular play for offense of its character, an independent series of indications of plays for defense subdivided into a plurality of independent sets each set for a particular character of play corresponding to a similar set for offense and each set being further subdivided to form fields of varying widths each field having notations answering the notations of its corresponding offensive set to indicate what was the defensive result of the offensive play indicated and a rotatable pointer for each set, whereby the player for the offense selects the character of play and the pointer thereof will indicate the particular offensive play made and the player for defense will spin the pointer of the corresponding defensive set to indicate what was the result of the said offensive play previously indicated.

WILLIAM H. HAMMETT.

Witnesses:
MOYAL HAMMETT,
E. J. HASSE.